J. A. HERRING.
INCLINOMETER.
APPLICATION FILED JUNE 4, 1920.

1,383,946.

Patented July 5, 1921.

John A. Herring
INVENTOR

BY

WITNESS:

ATTORNEY

UNITED STATES PATENT OFFICE.

JOHN A. HERRING, OF OKMULGEE, OKLAHOMA.

INCLINOMETER.

1,383,946.	Specification of Letters Patent.	Patented July 5, 1921.

Application filed June 4, 1920. Serial No. 386,436.

*To all whom it may concern:*

Be it known that I, JOHN A. HERRING, a citizen of the United States, residing at Okmulgee, in the county of Okmulgee and State of Oklahoma, have invented new and useful Improvements in Inclinometers, of which the following is a specification.

This invention comprehends the provision of an inclinometer designed for use in conjunction with aero-planes or the like and embodies among other features a pair of weight actuated hands movable over a graduated dial, and independently operable to indicate the degree of inclination of the machine, whether turning to the right or left, ascending, or descending.

Another object of the invention resides in providing the graduated dial with a plurality of webs, which not only serve to reinforce the dial but provide bearings for certain parts of the mechanism arranged at the rear of the dial and housed within a casing forming a part of the instrument.

The nature and advantages of the invention will be better understood when the following detail description is read in connection with the accompanying drawing, the invention residing in the construction, combination and arrangement of parts as claimed.

In the drawings forming part of this application like numerals of reference indicate similar parts in the several views and wherein:—

Figure 1:
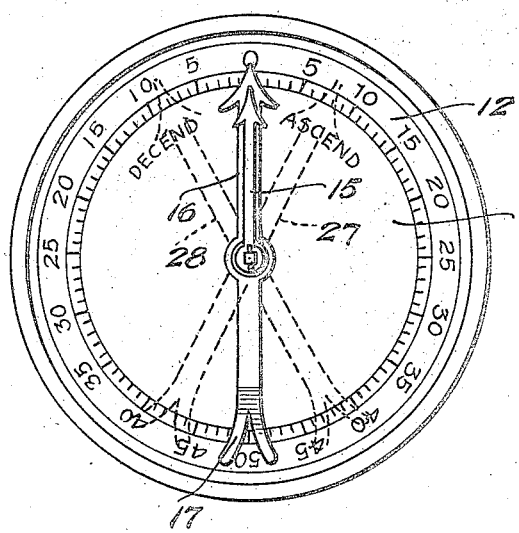
Figure 1 is a front elevation of the instrument constructed in accordance with my invention.
Figure 2:
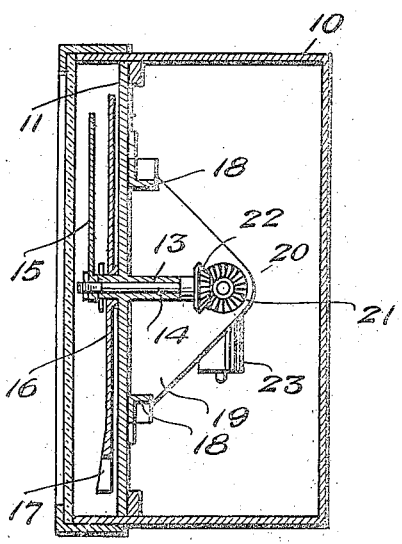
Fig. 2 is a longitudinal sectional view therethrough.
Figure 3:
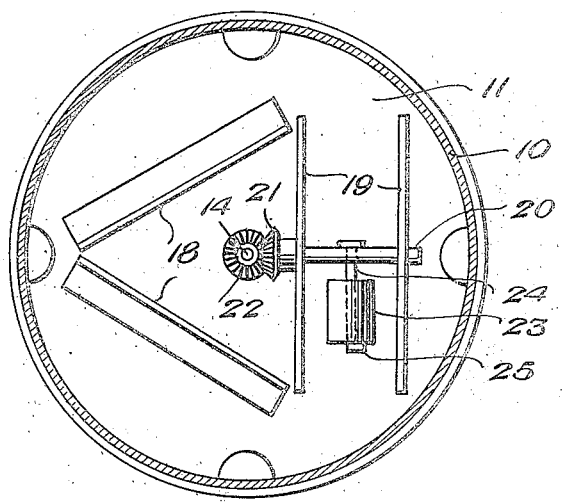
Fig. 3 is a sectional view taken at right-angles to Fig. 2.

Referring to the drawings in detail, 10 indicates a casing of any suitable construction which is closed at one end by the dial 11 which is graduated as indicated at 12. Projecting from the rear of the dial is a hollow tubular member 13 through which is passed the arbor 14 for the shorter hand 15, the long hand 16 being loosely mounted upon the arbor and weighted at its lower end as at 17. Also projecting from the rear of the dial 11 are the angularly disposed flanges or webs 18, and spaced parallel flanges 19, all of which serve to reinforce the dial, while the latter mentioned flanges constitute bearings for the transversely disposed shaft 20. One end of this shaft is equipped with a beveled gear 21 which meshes with a similar gear 22 carried by the adjacent extremities of the arbor 14, so that rotation of the shaft 20 is imparted to the arbor 14. Carried by the shaft 20 is a weight 23 which is detachably connected with said shaft in any suitable manner, preferably by means of a pin 24 passed through the shaft and also through the weight 23 and having its free end off-set as at 25. By reason of this construction, the weight can be readily and easily removed from the shaft when it is desired to assemble the parts, manifestly, the operating parts of the instrument being housed within the casing 10, while the dial together with the hands are covered by a crystal or transparent member 26.

In practice, the hands 15 and 16 respectively normally occupy the position indicated by full lines in Fig. 1, and when the machine is turned to the left the large hand 16 moves independently of the small hand, in a direction indicated by dotted lines at 27 to indicate the degree of inclination of the machine while making the turn, and when the machine is being turned to the left, the large hand 16 likewise turns in an opposite direction as indicated by dotted lines 28. In each of these instances, the small hand remains stationary, this hand being operable independently of the large hand to indicate the degree of inclination of the machine when the latter is ascending, descending, looping the loop, or in fact under all conditions, when the machine is not traveling in a true or horizontal plane. The small hand 15 is actuated through the instrumentality of the weight 17 which rotates the shaft 20, motion being imparted from said shaft to the arbor 14. When the machine loops the loop, the shaft 20 makes one complete revolution, the hand 15 also turning completely around and across the face of the dial. Manifestly, I have devised an instrument of the class in question which not only accurately indicates the degree of inclination of the machine under any and all conditions, but one which embodies the desired features of simplicity, durability and ruggedness.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

What I claim is:—

An inclinometer comprising a graduated dial, flanges projecting from one side of the dial, an arbor journaled on the dial, a hand fixed on said arbor, a second hand loosely mounted on the arbor and weighted at one end, a shaft journaled in said flanges, beveled gears carried by the adjacent extremities of said arbor and shaft and meshing with each other, and a weight removably associated with said shaft, said hands being gravity actuated and independently operable.

In testimony whereof I affix my signature.

JOHN A. HERRING.